Aug. 8, 1961 H. SCHMID 2,995,305

ELECTRONIC COMPUTER MULTIPLIER CIRCUIT

Filed Sept. 15, 1958

HERMANN SCHMID
INVENTOR

BY Richard D. Stephens
ATTORNEY

United States Patent Office 2,995,305

Patented Aug. 8, 1961

2,995,305

ELECTRONIC COMPUTER MULTIPLIER CIRCUIT

Hermann Schmid, Binghamton, N.Y., assignor to General Precision, Inc., a corporation of Delaware Filed Sept. 15, 1958, Ser. No. 761,200
5 Claims. (Cl. 235—194)

This invention relates to an electronic computer multiplier of the analog type, and is a continuation-in-part and improvement of my prior copending application, Serial No. 693,298, filed October 30, 1957, now Patent No. 2,973,146, for "Computer Multiplier." In my previous application there is shown a novel transistorized four-quadrant time-division multiplier which is very accurate, reliable, and inexpensive. In my prior device a transistor switch utilizing two PNP (or alternatively, two NPN) transistors is employed. Actually a number of pairs of such transistors are used, depending upon the number of multiplier channels to be constructed in any device. Briefly described, my prior application discloses an amplifier loop circuit which accurately time modulates an input signal in accordance with the value of an input variable. The time modulation is effected by superimposing a carrier upon a D.C. input voltage commensurate with the independent variable, and then sensing the polarity of the composite signal with respect to a reference potential, such as ground. The sensing means comprises a limiting or squaring amplifier, which provides a pair of inversely-related or push-pull rectangular wave output signals having time widths that vary in accordance with the value of the independent variable input signal. The time-modulated rectangular pulses are used to control further switches, each further switch consisting of a similar transistor pair. The transistor switches in the previous embodiments require push-pull control signals, so that the squaring amplifier utilized in the time modulation circuit must be capable of providing push-pull output. It is necessary that such push-pull control signals be of approximately the same amplitude and shape, and for this reason a control potentiometer is sometimes required in constructing my earlier invention, in order to compensate for differences in the transistor characteristics in any given transistor switch pair. The present invention utilizes a transistor switch which does not require push-pull control signals, and hence the squaring or limiting amplifier means used may be single-ended and need not provide push-pull output signals. Also, since the present invention incorporates a switch requiring only one control signal, the squaring or blocking amplifier requires no potentiometer or other means to balance the output signals, since there is only one output signal. Thus it will be seen that it is an object of the present invention to provide an improved four-quadrant electronic multiplier requiring a lesser number of parts and requiring no balancing adjustments.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
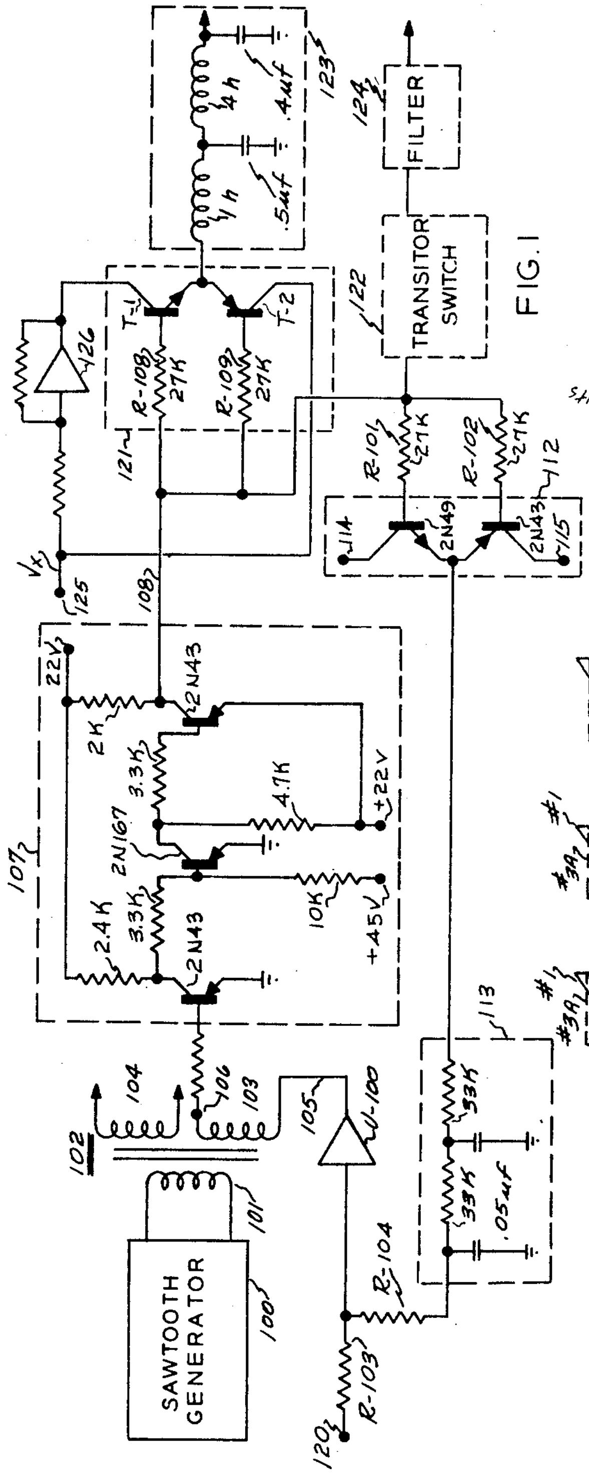
FIG. 1 is an electrical schematic diagram showing an illustrative embodiment of the invention.

Referring to the exemplary embodiment of FIG. 1, an oscillator or other source of alternating voltage shown in block form as comprising a sawtooth generator 100 supplies an alternating voltage of fixed amplitude and fixed frequency to the primary winding 101 of transformer 102. Preferably a sawtooth current is supplied to winding 101, so that a sawtooth voltage is induced in each secondary winding of transformer 102. Assuming that conductor 105 lies at ground or zero potential, it will be recognized that the sawtooth voltage at terminal 106 of secondary winding 103 will have equal positive and negative excursions, being positive for precisely one half cycle and negative for precisely one half cycle. A plot of the voltage at terminal 106 under such conditions is shown as waveform #1 of FIG. 2. Only one oscillator or alternating voltage source need be supplied for a large number of multipliers, and transformer 102 may be provided with a plurality of secondary windings to drive a plurality of multipliers constructed in accordance with the invention. While FIG. 1 discloses a specific method of superimposing an alternating voltage and a direct voltage, various other means are well known and may be used without departing from the invention.

Figures 2, 3:
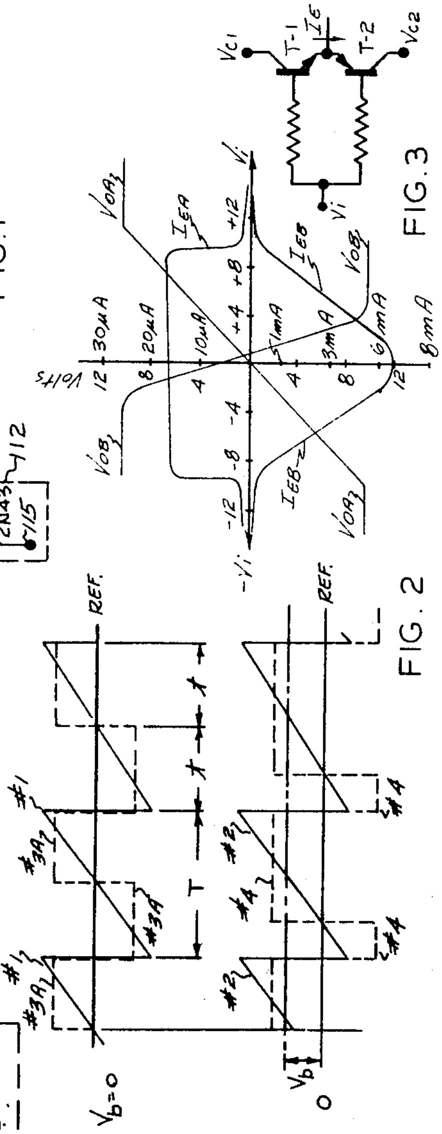
FIG. 2 is a diagram showing illustrative waveforms, useful in understanding operation of the invention.
FIG. 3 is a graph illustrating operation of a transistor switch portion of the invention.

If a direct voltage potential exists on conductor 105, it will be seen to shift the mean or average level of the potential at terminal 106. If conductor 105 is positive with respect to ground, it will be seen that the alternating potential at terminal 106 will be positive with respect to ground for more than one half cycle and negative with respect to ground for less than one half cycle. A plot of such a voltage is shown as waveform #2 of FIG. 2. It should be apparent that existence of a negative voltage on conductor 105 will make terminal 106 be negative for more than one half cycle and positive for less than one half cycle. The alternating voltage at terminal 106 is applied to a limiter amplifier shown within dashed lines at 107. The function of limiter amplifier 107 is to convert the alternating voltage at terminal 106 into square wave or block pulses. Limiter 107 is shown as comprising three grounded emitter amplifier stages. The limiter amplifier is over-driven, so that full positive output appears on conductor 108 whenever terminal 106 becomes slightly (about 20 millivolts) negative with respect to ground. Limiter 107 is shown as comprising a transistorized limiter amplifier, but may comprise a conventional vacuum tube limiter amplifier, or a bi-stable circuit such as a Schmidt trigger, without departing from the invention. The limiter amplifier is shown as including a single-ended output stage utilizing transistor TL–3. In my copending application two transistors were required to provide a push-pull output stage for the limiter amplifier. Shown as waveform #3A of FIG. 2 is a plot of the voltage on conductor 108 when conductor 105 lies at ground potential, and it will be seen that the voltage consists of positive and negative pulses of equal time duration, each pulse having a duration of one half cycle. If a constant positive potential exists on conductor 105, so that the alternating potential at terminal 106 varies as shown in waveform #2 in FIG. 2, the output voltage on conductor 108 will be negative for more than one half cycle and positive for less than one half cycle. If the sawtooth potential at terminal 106 is precisely linear, it should be apparent without further explanation that the increase in time duration of the positive pulses on conductor 108 will be directly proportional to the magnitude of the positve direct voltage existing on conductor 105. Conversely, if conductor 105 becomes negative with respect to ground, it will be seen that the resulting increase in time duration of positive pulses on conductor 108 will be directly proportional to the negative voltage on conductor 105, assuming again that a linear sawtooth voltage is induced in secondary winding 103.

Thus it will be seen that the function of the sawtooth voltage and limiter 107 is to convert the direct voltage existing on conductor 105 into a time-modulated signal. Since limiter amplifier 107 saturates whenever the voltage at terminal 106 slightly exceeds a few millivolts, the amplitudes of the positive and negative pulses on conductor 108 are determined by the power supply potentials applied to the limiter, and the amplitudes of the pulses remain constant throughout the pulse durations.

A direct voltage potential commensurate with one analog variable is applied at terminal 120 via scaling resistor R–103 to the input circuit of a conventional D.C. amplifier U–100 shown in symbolic form. Neglecting for the moment the feedback connection through resistor R–104, and assuming that amplifier U–100 is linear, it will be seen that the potential on conductor 105 would vary in accordance with the analog variable, so that the pulses on conductor 108 would be time-modulated in accordance with the value of the variable, which may be termed the $y$ variable for convenience of explanation. The time-modulated pulses on conductor 108 are accurately limited by a transistor switching circuit indicated generally at 112 and demodulated by a filter shown within dashed lines at 113, providing a direct voltage feedback signal which is applied to amplifier U–100 via feedback scaling resistor R–104. Thus it may be seen tthat amplifier U–100 is connected in a closed loop circuit, and conventional feedback amplifier analysis may be applied.

Designating the period of one sawtooth wave as T, the sawtooth amplitude as $V_s$, the period or width of a pulse on conductor 108 as $t$, and the bias or offset voltage on conductor 105 as $V_b$, all as indicated in FIG. 2, the following relationship may be written:

$$t=\frac{T}{2}\,\frac{V_s+V_b}{V_s} \text{ or } \frac{t}{T}=\frac{1}{2}\left(1+\frac{V_b}{V_s}\right) \qquad (1)$$

If stable and accurate reference voltages of magnitude $V_r$ and of opposite polarities are connected to terminals 114 and 115 of switching circuit 112, the amplitudes of the pulses applied to the switching circuit from conductor 108 will be limited very accurately to the values of the reference voltages, in a manner to be described below in greater detail. The demodulated or mean level value of the pulses applied to switching circuit 112 may be seen to be related to the filtered feedback voltage $V_f$ applied to amplifier U–100 in the following manner:

$$V_f=-V_r\left(1-2\frac{t}{T}\right) \qquad (2)$$

Substituting $t/T$ as defined in Equation 1 into Equation 2:

$$V_f=V_r1-\frac{2}{2}\left(1+\frac{V_b}{V_s}\right)=\frac{V_rV_b}{V_s} \qquad (3)$$

The bias or offset voltage $V_b$ on conductor 105 may be seen to be proportional to the resultant input voltage applied to amplifier U–100 multiplied by the gain A of the amplifier. The resultant input voltage may be seen to be proportional to the sum of the $y$ independent variable input voltage $V_y$ applied at terminal 120 and the feedback voltage $V_f$ applied via resistor R–104. Therefore, if $V_f$ in Equation 3 is replaced by $$\frac{V_rV_b}{V_s}$$

$$V_b=(V_y+V_f)A=AV_y+\frac{AV_rV_b}{V_s} \qquad (4)$$

$$V_b=\frac{AV_y}{1-\frac{AV_r}{V_s}} \qquad (5)$$

Substituting the expression of Equation 5 for $V_b$ in Equation 1:

$$1-2\frac{t}{T}=1-\frac{2}{2}\left(1+\frac{V_b}{V_s}\right)=\frac{\frac{AV_y}{1-\frac{AV_r}{V_s}}}{V_s} \qquad (6)$$

Multiplying through by $V_s$:

$$1-2\frac{t}{T}=\frac{AV_y}{V_s-AV_r} \qquad (7)$$

By providing amplifier U–100 with sufficient gain, the quantity $AV_r$ can be made to be many times larger than $V_s$, so that Equation 7 may be written with negligible error as follows:

$$1-2\frac{t}{T}=\frac{-V_y}{V_r}k \qquad (8)$$

where $k$ is a scaling constant.

From Equation 8 it may be seen that the output time modulation $$\left(1-2\frac{t}{T}\right)$$

on conductors 108 is directly proportional to $V_y$, the independent variable input potential, and inversely proportional to $V_r$, the reference voltage applied to switching circuit 112. When the gain A of amplifier U–100 is high, the time modulation $$\left(1-2\frac{t}{T}\right)$$

will now be seen to be independent of the amplitude, linearity and frequency of the sawtooth wave, and hence it may be apparent now that the alternating voltage source 100 may be a sine wave source rather than a sawtooth wave source if desired.

If constant reference voltages are applied to terminals 114 and 115, so that $V_r$ of Equation 8 is a consant, the time modulation will be seen to be dependent solely upon $V_y$, the applied potential representing the independent variable $y$. If the reference voltages applied at terminals 114 and 115 are made to vary in accordance with a second independent variable $z$, the circuit will function as a divider. Operation as a divider may be understood by comparison of the circuit of FIG. 1 with that of a conventional feedback amplifier division circuit, which need not be shown herein. Those skilled in the art realize that if the feedback voltage of a feedback amplifier is modified in accordance with an independent variable, that the amplifier operates to provide an output voltage which varies inversely with said variable. If the reference voltages at terminals 114 and 115 are made to increase in accordance with a $z$ variable, the amplitudes of the pulses passing through switching circuit 112 will increase correspondingly. As in conventional feedback amplifiers, use of a weak feedback signal, which occurs when the magnitudes of the potentials at terminals 114 and 115 become small, provide less accurate and less linear operation, so division by small values will provide more error than otherwise. In the embodiment shown the gain around the feedback loop was of the order several million for D.C., but of the order of 10,000 to 20,000 at about 10 cycles per second.

Use of high amplifier gain may be seen to make the time modulation less dependent on frequency, linearity and amplitude of the alternating voltage source. On the other hand the end purpose of the portions of the circuit thus far described is solely the provision of an accurately time-modulated signal, and if a precisely linear sawtooth voltage is available, the invention may be operated without amplifier U–100 and the feedback loop shown.

The time-modulated pulses on conductor 108 are applied to one or more transistor switching circuits 121, 122, etc. As many transistor switches as desired may be connected to the output terminals of limiter 107 by providing sufficient power output from amplifier 107. Each transistor switch provides means for multiplying by a separate second independent variable. Transistor switch 121 may be seen in FIG. 1 to comprise an NPN transistor and a PNP transistor connected emitter-to-emitter. The operation of each switch is similar to that of an ideal single-pole double-throw switch. The width or time duration of each pulse applied to the switch has been shown to be directly proportional to the value of the $y$ variable. If switch 121 will limit the amplitude excursions of each pulse in accordance with the value of a second independent variable, the $x$ variable, it will be seen that pulse area will vary in accordance with the product $xy$ of the two variables, and if the pulses are averaged by means of a suitable filter, a direct output voltage varying in accordance with the product of the two variables will be achieved. It should be apparent at this point that either or both of the independent variable input voltages may be made either positive or negative, and that a correct multiplication will occur, with the signs of the input variables being appropriately considered throughout all four quadrants of operation. The bi-directional operation of transistors makes such multiplier operation possible by simple circuitry. Since the transistor switches decrease or limit the amplitudes of the pulses on conductor 108, it should be apparent at this point that the limiting amplifier 107 should be arranged to provide square wave voltages of an amplitude at least slightly greater than the largest $x$-variable voltage to be multiplied. The time-modulated pulses from the limiting amplifier are applied via resistors R–108 and R–109 to the base electrodes of each transistor of each switch pair.

For convenience of explanation, assume that the rectangular pulses on conductor 108 make positive and negative excursions of plus and minus 15 volts. Also assume that the instantaneous value of the $x$ variable is proportional to 10 and that 10 volts are present at terminal 125. The 10 volt potential is applied in one polarity directly to the collector electrode of transistor T–2 and in opposite polarity to the collector electrode of transistor T–1, a conventional unity-gain D.C. amplifier 126 being shown as a polarity-inversion means.

With +10 volts on the collector of T–1 and −10 volts on the collector of T–2, transistor T–1 functions as an emitter follower having T–2 as its load impedance during any time that the base drive voltage $V_a$ applied from conductor 108 is less in magnitude than the magnitude of the $x$ variable voltage (assumed to be 10 volts) but positive with respect to ground on the transistor collector electrodes. Thus as the $V_A$ voltage rises from zero in a positive direction, the output voltage at the transistor emitter electrodes follows closely. Inasmuch as the pulses have almost vertical leading and trailing edges, it will be seen that operation of the transistor as an emitter follower occurs only for an extremely brief period.

As the $V_A$ voltage reaches and exceeds 10 volts, it will be seen that the collector-base and emitter-base junctions of transistor T–2 becomes reverse biased, and the collector-base and emitter-base junctions of transistor T–1 becomes forward biased. Therefore transistor T–1 conducts, while T–2 is cut-off. With T–2 cut off and T–1 conducting, it will be seen that the output voltage at the emitters will be very nearly that of the $x$-variable voltage of +10 volts present at the collector electrode of transistor T–1. The output voltage will differ from 10 volts only by approximately one millivolt. As the base drive voltage $V_A$ continues upwardly to 15 volts and remains at 15 volts throughout the duration of the positive $V_A$ pulse, the output voltage at the emitters will remain at ten volts. When the $V_A$ voltage starts down at the trailing edge "$b$" of the pulse, the output voltage remains at ten volts until $V_A$ reaches and begins to become less than 10 volts. The circuit then becomes an emitter follower again, and the output voltage swings with the $V_A$ base voltage from +10 volts through zero or ground toward −10 volts. When $V_A$ becomes negative T–2 functions as emitter-follower and T–1 as the load impedance. As the $V_A$ pulse becomes more negative than −10 volts, it will be seen that the emitter base and collector base junctions of T–2 will be forward biased, causing T–2 to conduct, while the emitter-base and the collector-base junctions of T–1 will be reversed-biased, and T–1 will be cut off. Now the output voltage at the emitters will be very nearly that of the $x$-variable voltage of −10 volts present at the collector electrode of transistor T–2. The output will remain at −10 volts as long as the negative $V_A$ base drive voltage exceeds −10 volts.

Typical characteristics of transistor switches of the types which may be utilized are shown in FIG. 3, wherein collector current $I_c$, emitter current $I_E$ and base current $I_B$ are shown plotted against base driven voltages. It should be noted that the currents each are almost zero when base drive voltage $V_A$ is larger than the applied collector voltage $V_x$. In the transition region during which one transistor acts as an emitter follower collector current $I_c$ and emitter current $I_E$ increase from zero at one extreme to a maximum shortly before the opposite extreme, while base current $I_B$ increases proportionally with the base drive voltage $V_A$.

With −10 volts applied to the collector of T–1 and +10 volts at the collector of T–2 (i.e., the $x$-variable is altered in sign from the previous case), operation of the transistor switch may be understood by visualizing the switch as comprising one transistor connected as an amplifier but with the collector and emitter electrodes interchanged with the other transistor acting as a load impedance. If the two transistors were completely identical in their electrical characteristics, T–1 would operate as an inverted amplifier and T–2 as load, when $V_1$ is positive with respect to ground, because T–1 base current and thus T–1 collector current are larger than those of T–2. Similarly, T–2 would operate as an inverted amplifier and T–1 as a load when $V_1$ is negative with respect to ground. Since it will almost never occur that two transistors have precisely identical electrical characteristics, the cross-over point, i.e., the point where the transistors change their functions, will occur when $I_{c1}=I_{c2}$. In the previous case ($V_{x1}=+10$ v., $V_{x2}=-10$ v.) a transistor saturates when the voltage on the base, $V_1$ was larger than the collector potentials. In this case the transistors saturate when the base current in the transistor functioning as an inverted amplifier reaches a certain amount. The voltage $V_1$, for which this saturation occurs, thus varies between different transistors, just as the inverse multiplication factor ($\alpha_I$) varies. All of this operation occurs only in the transition region (i.e., when the rectangular pulses change from positive to negative and vice versa) in less than one microsecond in most practical embodiments of the invention.

The transistor characteristic which allows provision of an almost ideal switch is the fact that extremely small voltage drops exist between the emitter and collector of the conducting transistor, so that the emitter output voltage corresponds almost exactly to the second variable voltage applied to the transistor collector. In the preferred form of the invention, both transistors of each switch are connected in the grounded collector configuration shown. While such connection requires more power to control the switch, smaller voltage drops exist between collector and emitter of a conducting transistor.

For optimum operation of the time-division multiplier the transistor switches should be able to handle fairly large voltages, the voltage drop across the conducting branch of the switch should be as small as possible, and the switch should be capable of operation at high speeds. To satisfy these requirements, one should use transistors in which the rated collector-base voltages $V_{CB}$, the rated emitter-base voltages $V_{EB}$ and the rated punch-through voltage each are high. Since each of these breakdown voltages depend upon the external base resistance $R_B$, it would be desirable that $R_B$ be made as small as possible. However, it will be seen from FIG. 3 that since the peak emitter and collector currents which flow during the transition mode are determined by the amount of base current which flows in the emitter follower transistor, it may be desirable if $R_B$ is increased to decrease base current $I_B$ thereby to decrease peak emitter and collector currents. Such currents flow only during a portion of the cycle, and the greater the peak values of these currents, the greater the load placed on whatever voltage source is used to supply the analog variable voltages applied to the collector electrodes, causing ripple if such load is too great. Thus two opposite considerations affect selection of the optimum base resistance, and a compromise value may be chosen.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense. While exemplary and workable circuit values are shown in FIG. 1, those skilled in the art will have no trouble altering such values in accordance with known techniques without departing from the invention.

Having described my invention, what I claim as new and desire to secure by Letters Patent is:

1. Electronic multiplying apparatus, comprising, in combination, time modulation means for deriving a rectangular wave voltage having a given peak positive and peak negative amplitude and having a time modulation commensurate with the value of an applied first direct voltage, a transistor switching circuit connected to said rectangular wave voltage and to a pair of opposite polarity direct voltages to limit the amplitude excursions of said square wave voltage to values substantially commensurate with said pair of opposite polarity direct voltages, thereby to provide a further rectangular wave voltage, and filter means responsive to said further rectangular wave voltage to provide an output voltage commensurate with the product of the amplitude of said first direct voltage times the amplitude of said opposite polarity direct voltages, said time modulation means including amplifier means connected to amplify said first direct voltage, means for modulating said amplified direct voltage at a selected modulation frequency to provide said rectangular wave voltage, amplitude-limiting modulator means comprising a second transistor switching circuit responsive to said rectangular wave voltage, and second filter means connected to said second transistor switching circuit to provide a direct voltage feedback potential, and circuit means for applying said feedback potential degeneratively to said amplifier means.

2. Apparatus according to claim 1 in which said second switching circuit is connected to a pair of fixed reference voltages, and in which said second switching circuit is operable to limit the amplitudes of the positive and negative excursions of said rectangular wave voltage in accordance with the amplitudes of said fixed reference voltages.

3. Apparatus according to claim 1 in which said second switching circuit is connected to a pair of applied voltages which vary in amplitude in accordance with an independent variable, and in which said second switching circuit is operable to limit the amplitudes of said square wave voltages in accordance with said independent variable, thereby causing said feedback potential to vary in accordance with said independent variable.

4. Apparatus according to claim 1 in which said second transistor switching circuit comprises two transistors of opposite conductivity types, each having base, emitter and collector electrodes, circuit means for applying said rectangular wave voltage to said base electrodes, and circuit means for applying a further pair of opposite polarity direct voltages to said collector electrodes, said emitter electrodes of said transistors being connected together and to said second filter means to provide said feedback potential.

5. Apparatus according to claim 1 in which said means for modulating comprises a transformer having a secondary winding into which a periodic alternating modulating frequency voltage is induced, said secondary winding being conductively connected to the output of said amplifier means to control the average potential level of said secondary winding.

References Cited in the file of this patent

UNITED STATES PATENTS

| | | |
|---|---|---|
| 2,773,641 | Baum | Dec. 11, 1956 |
| 2,849,181 | Lehmann | Aug. 26, 1958 |
| 2,864,961 | Lohman et al. | Dec. 16, 1958 |
| 2,880,332 | Wanlass | Mar. 31, 1959 |

OTHER REFERENCES

"A High-Accuracy Time-Division Multiplier," Goldberg, RCA Review, September, 1952, pages 265–273.

"A Stabilized Electronic Multiplier," Morrill et al., Electronics, December 1952, pages 139–141.

"Triangular-Wave," Meyers et al., Electronics, August 1956, pages 182–185.